TRANSMISSION SYSTEM

Filed Jan. 2, 1952

INVENTOR.
ROGER D. THOMPSON
BY Darby & Darby
ATTORNEYS

United States Patent Office 2,719,955

Patented Oct. 4, 1955

2,719,955

TRANSMISSION SYSTEM

Roger D. Thompson, Pompton Plains, N. J., assignor to Allen B. Du Mont Laboratories, Inc., Clifton, N. J., a corporation of Delaware Application January 2, 1952, Serial No. 264,368

1 Claim. (Cl. 332—41)

This invention relates to the modulation of electrical carrier waves by means of electrical signals. In particular, it relates to the amplitude modulation of carrier waves according to the so-called vestigial sideband standard employed in the television art.

In vestigial sideband transmission some, or all, of one sideband of an amplitude modulated carrier and only part of the other sideband are transmitted. The legal standards for the shape of the pass band for commercial television follow this type of transmission and must be strictly adhered to; so that it is common to employ a plurality of electrical filters in television transmitters to dissipate all of the energy generated outside of the prescribed band, and in particular, most of the energy generated in the lower side band. The dissipation of this energy at high power levels, where it is usually accomplished, is an expensive waste, and it is one object of this invention to obviate such waste.

Moreover, if the filtering is done in the transmitter, it must necessarily be effected by band pass filters in which difficulties may arise due to undesired phase distortion in the pass band. This is especially true in the case of transmitters operating in the ultra-high frequency band where it is practically impossible to obtain the required rate-of-decrease of the transmission band at the edge thereof. It is therefore desirable to perform most of the filtering by means of comparatively simple low pass filters operating on the low frequency electrical signal prior to modulation of the carrier wave therewith, and this forms a second important object of the invention.

Another object is to provide an improved method together with the apparatus for producing vestigial sideband signals.

Still further objects will be apparent after reading the following specification together with the drawings in which.

In carrying out the objects of the invention, a complex signal voltage is applied to a low pass filter, and the restricted bandwidth output signal produced therein is mixed with a replica of the original signal in inverse polarity and in the proper amplitude relationship to cancel corresponding low frequency components of the replica signal, leaving the high frequency components substantially unaltered. The term "replica" is used here to denote a signal having substantially the same wave form as the input signal except for the possibility of an inversion of polarity and/or a delay in time. The two signals thus produced, i. e., the output signal of the mixer and the output signal of the filter, are applied to individual modulators to modulate separately a carrier wave. Either or both of these modulators may be standard amplitude modulators in which both side bands are produced, or they may be amplitude modulators of the type in which only one sideband is produced. For the generation of television-type vestigial sideband signals both sidebands produced by modulation of a carrier with the filtered signal and the upper sideband produced by modulation of the same carrier with the output of the mixer are added together to form a complete signal for transmission.

Figure 1:
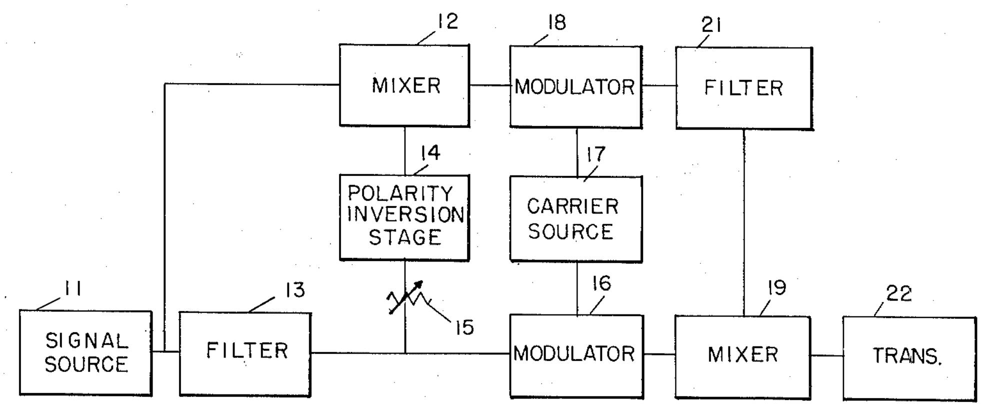
Fig. 1 shows in block diagram form the transmission system which is the subject of the invention.
Figure 2:
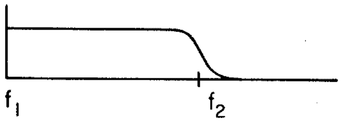
Fig. 2 shows the pass band of the video frequency signal which it is desired to transmit by means of the circuit in Fig. 1.
Figure 3:
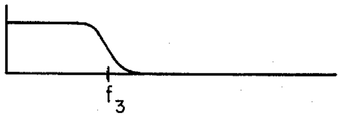
Fig. 3 shows a restricted portion of the band of Fig. 2 after filtering in the circuit of Fig. 1.

In Fig. 1, the signal source 11 provides a signal constrained, as shown in Fig. 2, to a frequency spectrum between a lower frequency $f_1$, which may be zero, and an upper frequency $f_2$. The signal source 11 may be a television signal generator, although the invention is not limited thereto, and is provided with a first output circuit connected to a mixer or adder circuit 12 and a second output circuit connected to a band pass filter 13. The output signal of the filter 13 is shown in Fig. 3 and may be any restricted portion of the spectrum from $f_1$ to $f_2$; although ordinarily it will be the lower portion between $f_1$ and $f_3$ in which case the band pass filter 13 may be replaced by a low pass filter. The output circuit of filter 13 is connected to another input circuit of the mixer 12.

The circuits described thus far are assumed to be linear in operation and with either negligible or the same time delay so that the signal from filter 13 corresponds exactly to the same spectral portion of the signal applied directly from source 11 to the mixer 12 and is opposite in polarity thereto. If this opposite polarity relationship does not naturally obtain for the added signals, a polarity inversion stage 14 may be inserted so that the signal resulting from the algebraic addition will comprise only the portion of the replica signal in the spectrum space between frequency $f_3$ and frequency $f_2$ as shown in Fig. 4.

Figure 4:
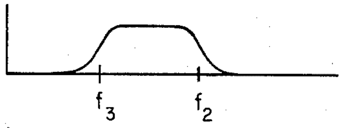
Fig. 4 shows the high band signal which is complementary to the signal of Fig. 3 and together therewith forms the signal of Fig. 2.

Several advantages inhere in the use of a low pass filter and a subtractive method to form a low band and a high band signal as depicted in Figs. 3 and 4 respectively. In the first place, a low pass filter having the required amplitude and phase characteristics in generally simpler to construct than a band pass filter having the same freedom from undesired responses in the pass band, and second, the signals of Figs. 3 and 4 may be reunited into the regular wide band signal of Fig. 2 due to the fact that the frequency characteristics of Figs. 3 and 4 are inherently complementary on either side of frequency $f_3$.

The inversion stage 14 and gain control 15 could be inserted between source 11 and mixer 12 but are shown here as being inserted between filter 13 and mixer 12 is order to take advantage of the restricted band width of the signal at that point.

The output of the filter 13 is also connected to an amplitude modulator 16 which is supplied with a carrier signal by a carrier generator 17. The modulator 16 may be a conventional amplitude modulator or it may be a balanced modulator with provision for generating a single sideband signal. For purposes of illustration, it will be considered to be an ordinary double side band amplitude modulator with the pass band shown in Fig.

5 from $f_c-f_3$ to $f_c+f_3$ and including the carrier frequency $f_c$, itself.

Figure 6:
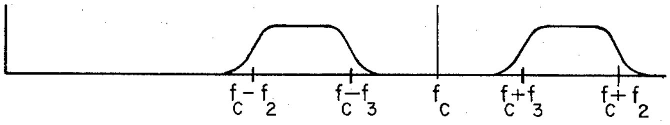
Fig. 6 shows the pass band of the same carrier modulated in accordance with the signal of Fig. 4.
Figure 7:
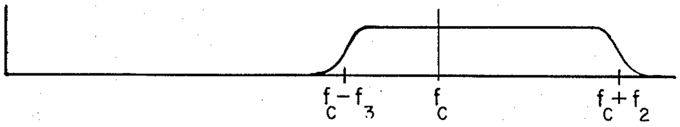
Fig. 7 shows the pass band of the signal resulting from the combination of the signals in Figs. 5 and 6 according to the invention.

The output circuit of the mixer 12 is connected to a second amplitude modulator 18 which may have the characteristics of either of the types mentioned before in connection with modulator 16. In this case, modulator 18 is assumed to be of the so-called balanced type with the carrier cancelled so that the output signal therefrom consists of the two separated bands shown in Fig. 6. One of these bands lies in the spectrum space from $f_c-f_2$ to $f_c-f_3$, and the other band lies between $f_c+f_3$ and $f_c+f_2$. The signal from the modulator 16 is applied to a second mixer 19 while the output signal of modulator 18 is applied to another input circuit of the mixer 19.

In the event that a standard amplitude modulator is used for modulator 18, it will be necessary to provide a filter 21 to remove the carrier and one of the side bands generated in the modulation process. This filter, although of the bandpass type, need not be sharply selective since it may have a gradual cutoff extending substantially from the carrier frequency $f_c$ to the lower end of the upper side band $f_c+f_3$ if the upper side band is the one chosen to pass through the filter 21, as will be the case for television type signals. The output signal of the linear mixer 19, therefore, constitutes the entire band of frequencies between $f_c-f_3$ and $f_c+f_2$ including the carrier frequency $f_c$ and is suitable for use in a transmitter 22 or other utilization circuit. This signal is of the vestigial sideband type commonly employed in television transmission.

The deletion of the carrier frequency $f_c$, as well as the lower sideband by the filter 21 was necessitated by the fact that the carrier component from modulator 18 would otherwise mix with the carrier component included as one of the products of the modulator 16 and would therefore be included twice. However, the phase of the carrier for modulator 16 would be indeterminate with respect to the phase of the carrier from modulator 18 and it might happen that the phases would be such as to cancel out the carrier component, or alternatively, the phase relations might result in having a carrier of double amplitude. Either of these possible limiting conditions would be undesirable, so one of the carrier components may be deleted, and it is easier to delete that from modulator 18.

Figure 5:
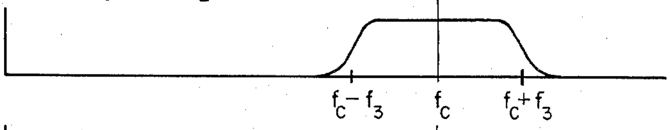
Fig. 5 shows the pass band of a carrier wave amplitude modulated by the signal of Fig. 3.

Although a vestigial sideband signal has been described, the true single sideband signal can also be generated in the same way provided only that the output signal of the modulator 16 as shown in Fig. 5 is filtered to remove the sideband on the same side of the carrier frequency as is removed by the filter 21; i. e., the lower sideband, or the modulator 16 may be of the type which produces only a single upper side band. Modulators of this type generally operate satisfactorily only over a narrow band width so that this invention provides an especially suitable means for generating wide band single side band signals.

Other modifications may occur to those skilled in the art so that the limit of the invention is to be determined only by the following claim.

What I claim is:

An electrical circuit comprising a source of electrical signals lying within a frequency band; a low pass filter; a first connection between one input of said mixer and an output of said source to pass those of said signals within a restricted lower portion of said band and to reject substantially completely those of said signals outside of said restricted portion; a mixer connected to said source; a second connection between a second input of said mixer and an output of said filter to mix in opposite polarity the signals from said mixer and said filter, said second connection comprising means to adjust the amplitude of signals from said filter to cause the signals from said filter to cancel out corresponding signals from said source, thereby to obtain from said mixer an output signal comprising those of said first-named signals complementary to the signals lying within said restricted portion; a source of carrier signal; a first amplitude modulator connected to said mixer and to said carrier source to modulate said carrier signal by the output signal from said mixer; a second filter connected to said modulator to pass only one sideband of the output signal therefrom; a second amplitude modulator connected to said first named filter and to said carrier source to modulate said carrier signal by the output signal from said filter; and a second mixer circuit connected to said second modulator and said second filter to mix the output signals therefrom.

References Cited in the file of this patent

UNITED STATES PATENTS

| | | |
|---|---|---|
| 1,759,952 | McCurdy | May 27, 1930 |
| 1,902,031 | Holden | Mar. 21, 1933 |
| 1,956,121 | Craig | Apr. 24, 1934 |
| 2,110,046 | Koomans | Mar. 1, 1938 |
| 2,236,134 | Gloess | Mar. 25, 1941 |
| 2,243,221 | Quilter | May 27, 1941 |
| 2,455,959 | Mark et al. | Dec. 14, 1948 |